July 28, 1931.　　　F. X. CAMPBELL　　　1,815,966
MIRROR
Filed Jan. 28, 1930
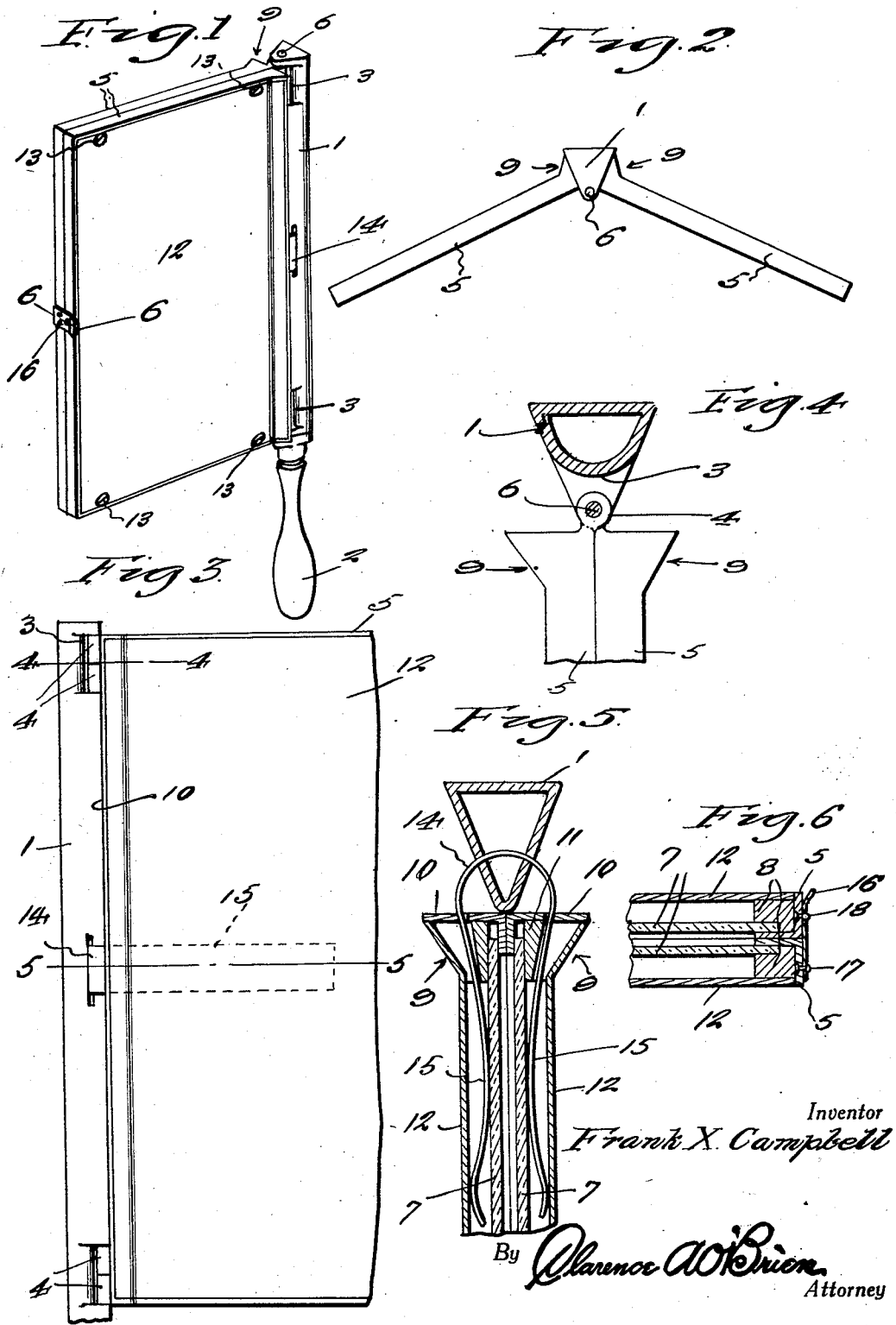
Inventor
Frank X. Campbell
By Clarence A. O'Brien
Attorney Patented July 28, 1931

1,815,966

UNITED STATES PATENT OFFICE

FRANK X. CAMPBELL, OF BRONX, NEW YORK

MIRROR

Application filed January 28, 1930. Serial No. 424,000.

This invention relates to mirrors and more particularly to devices of this character which are especially adapted for use in barber shops and beauty parlors but it is to be understood that a mirror constructed in accordance with this invention may be utilized in any manner for which same is found adapted.

An important object of the invention is to provide, in a manner as hereinafter set forth, a mirror of the aforementioned character embodying a pair of complemental hingedly mounted mirrors adapted to be simultaneously swung to open position through the medium of a resilient element when in use, said mirrors being further adapted, when not in use to be swung into opposed position with respect to each other, and retained in the last named position in a manner to form a compact article requiring a minimum of space.

Another important object of the invention is to provide a mirror of the character described having a pair of duplicate skeleton supporting frames for the mirrors hingedly mounted on a common support and wherein said support and each of the frames are provided with coacting surfaces for abutting engagement with each other in a manner to limit the swinging movement of the mirrors and maintain same at the desired angle with respect to each other when said mirrors are in open position for use.

Further objects of the invention are to provide a mirror which will be light in weight, strong, durable, simple in construction, efficient in its use and may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:

Figure 1 is a perspective view of a mirror constructed in accordance with this invention in folded or closed position, Figure 2 is a top plan view of the mirror in open position, Figure 3 is a fragmentary view in side elevation illustrating the hinged supporting means for the mirrors, Figure 4 is a fragmentary view in horizontal cross section taken substantially on the line 4—4 of Figure 3, Figure 5 is a fragmentary view in horizontal section taken substantially on the line 5—5 of Figure 3, Figure 6 is a fragmentary horizontal sectional view taken substantially on the line 6—6 of Figure 1.

Referring to the drawings in detail, the reference numeral 1 designates an elongated supporting bar of substantially triangular cross section, said bar being preferably constructed of a light weight metal such as aluminum and further being preferably hollow, and illustrated to advantage in Figure 5 of the drawings.

The lower end portion of the bar 1 is formed to provide a handle 2 which is longitudinally alined with said bar. Adjacent its upper and lower end, the triangular portion of the bar 1 has one of its corner portions provided with somewhat elongated recesses or notches 3 for the reception of the vertically disposed hinge forming gears or lugs 4 formed integrally with and projecting from the rear sides of a pair of substantially rectangular metallic skeleton frames 5.

Pintles 6 extend through the hinged ears 4 of the frames 5 and have their opposite ends anchored in the opposed walls of the recesses 3 in the supporting bar 1 in a manner to hingedly mount the frame on said bar.

The frames 5 are formed of angle iron disposed in a manner to provide opposed abutting engagemets with each other as illustrated to advantage in Figure 6 of the drawings. Mounted within the frame 5 and disposed against the outer faces of the abutting portions of said frame is a pair of mirrors 7 which have their edges disposed in spaced relation to the angularly extending marginal portions of the frame as also seen to best advantage in Figure 6 of the drawings.

Strips 8, preferably of wood, are disposed in free end portion of the frames 5 and said strips are recessed on their inner sides for the reception of the adjacent marginal portion of the mirrors 7.

The end portion of the frames adjacent the supporting bar 1 are directed outwardly, as at 9, to provide a comparatively wide end wall 10 for each of the frames adapted for engagement with the adjacent sides of said supporting bar, as illustrated in Figure 2 of the drawings, to limit the outward swinging movement of the frame. Substantially triangular filler strips 11 are mounted in this portion of the frame for maintaining the mirrors 7 in proper position against the opposed portion of said frame.

Metallic plates 12 are disposed within the outer side portions of the frame 5 and rest against the filler strips 8 and 11 and said plates are secured in place through the medium of the screws 13 which extend through the strips adjacent the edges of the mirrors 7 and are threaded into the opposed portion of the frame 5.

A resilient expansible, substantially U-shaped spring 14 has its closed end portion extending transversely through an intermediate portion of the supporting bar 1 and the leg 15 of said spring projects into the frame 5 and extends between the mirrors 7 and metallic plates 12, as illustrated in Figure 5 of the drawings. The free end portions of the arms 15 of the spring 14 are engaged with the plate 12 in a manner to yieldingly urge same outwardly to swing the frame and the mirrors therein to open position.

It will be seen that the spring 14 has its arm extending into the frame through openings provided in the portions 10 of said frame and said arms also extend through the triangular filler strips 11.

A spring latch 16 is fixed, as at 17, on one of the frames 5 at the free end thereof for engagement over a pin 18 on the complemental frame for securing said frame in closed position.

When not in use, the mirrors are swung to the position illustrated in Figure 1 of the drawings and retained in this position by the spring latch 16. When the latch 16 is disengaged from the pin 18, the U-shaped spring 14 swing the mirrors apart on the supporting bar 1 until the rear wall 10 of the frame engage with the adjacent sides of the said supporting bar and said mirrors are thus yieldingly maintained in the open position illustrated in Figure 2 of the drawings.

In this position, the angles of the mirrors is such that, when held behind his head, a patron who is looking into a mirror in front of him is enabled to inspect both rear side portions of his head without the necessity of having the mirror moved from side to side as is now the common practice.

It may be well to here mention that the portions of the spring 14 which are free of the supporting bar 1 are adapted to slide into and out of the frame 5 in order that the swinging movement of said frame on the supporting bar will be permitted.

It is believed that the many advantages of a mirror constructed in accordance with this invention will be readily understood, and although the preferred embodiment of the invention is as illustrated and described, it is to be understood that changes in the details of construction may be had which will fall within the scope of the invention as claimed.

Having thus described my invention, what I claim as new is:

1. A mirror of the character described comprising a supporting bar, a pair of substantially rectangular metallic, skeleton frames hingedly mounted on one side of the supporting bar for swinging movement toward and from each other, said frames adapted to be disposed in opposed abutting relation to each other, a mirror rigidly mounted in each frame and a resilient substantially U-shaped spring mounted on the supporting bar and having its opposite end portions associated with the frames in a manner to normally urge same apart, and a spring latch mounted on the free end portion of one of the frames for engagement with the other of said frames for detachably securing said frames in abutting relation to each other.

2. A mirror of the character described comprising a supporting bar of substantially triangular cross section, a pair of frames hingedly mounted on the bar for swinging movement toward and away from each other, certain of the walls of the frames being adapted for engagement with certain of the sides of the supporting bar for limiting the outward swinging movement of said frame to a predetermined angle with respect to each other, a mirror rigidly mounted in the frames.

3. A mirror of the character described comprising a supporting bar of substantially triangular cross section, a pair of frames hingedly mounted on the bar for swinging movement toward and away from each other, certain of the walls of the frames being adapted for engagement with certain of the sides of the supporting bar for limiting the outward swinging movement of said frame to a predetermined angle with respect to each other, a mirror rigidly mounted in the frame, a resilient element mounted on the supporting bar and engaged with the frames in a manner to normally urge same apart.

4. A mirror of the character described comprising a supporting bar of substanially triangular cross section, a pair of skeleton rectangular frames hingedly mounted on one side of the supporting bar for swinging movement toward and away from each other, the hinged ends of the frames being engageable with the adjacent side of the supporting bar in a manner to limit the outward swinging movement of said frames thereon at an angle with respect to each other, a mirror rigidly mounted in each frame and a resilient, substantially U-shaped spring mounted on the supporting bar and having its opposite end portions associated with the frames in a manner to normally urge same apart.

5. A mirror of the character described comprising a supporting bar substantially triangular in cross section, a pair of metallic, substantially rectangular skeleton frames formed of angle iron hingedly mounted on the supporting bar for swinging movement toward and away from each other, said frames adapted for abutting engagement with each other, a mirror disposed against the abutting portion of each of the frames and having its marginal edges spaced from the marginal portions of each of the frames, metallic plates secured in each of the frames rearwardly of the mirrors, filler strips disposed between the mirrors and the plates in a manner to maintain said mirrors and plates in spaced relation, and a substantially U-shaped resilient spring mounted on the supporting bar and having its opposite end portions extending into the frame and engaged with the plates in a manner to normally urge the mirrors apart.

In testimony whereof I affix my signature.

FRANK X. CAMPBELL.